United States Patent
Corl, Jr. et al.

(10) Patent No.: US 7,546,281 B2
(45) Date of Patent: Jun. 9, 2009

(54) REDUCTION OF TERNARY RULES WITH COMMON PRIORITY AND ACTIONS

(75) Inventors: Everett A. Corl, Jr., Raleigh, NC (US); Clark D. Jeffries, Durham, NC (US); Brooks Johnston, Cary, NC (US); Plyush C. Patel, Cary, NC (US); Jan Van Lunteren, Adliswll (CH)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 11/466,472

(22) Filed: Aug. 23, 2006

(65) Prior Publication Data
US 2008/0189233 A1    Aug. 7, 2008

Related U.S. Application Data

(62) Division of application No. 10/354,406, filed on Jan. 30, 2003.

(51) Int. Cl.
*G06N 5/00*    (2006.01)

(52) U.S. Cl. .................................. 706/47; 706/45
(58) Field of Classification Search ............... 706/47, 706/45
See application file for complete search history.

(56) References Cited

U.S. PATENT DOCUMENTS

| | | | | |
|---|---|---|---|---|
| 4,611,310 A | * | 9/1986 | Durbin | 365/230.01 |
| 5,813,001 A | * | 9/1998 | Bennett | 707/3 |
| 6,058,392 A | * | 5/2000 | Sampson et al. | 707/6 |
| 6,298,340 B1 | * | 10/2001 | Calvignac et al. | 707/3 |
| 2002/0007446 A1 | * | 1/2002 | Stark | 711/158 |
| 2002/0191605 A1 | * | 12/2002 | Lunteren et al. | 370/389 |

\* cited by examiner

*Primary Examiner*—Wilbert L Starks, Jr.
(74) *Attorney, Agent, or Firm*—Dillion & Yudell LLP

(57) ABSTRACT

A system for reducing the size of a database includes a memory in which the database configured in a ternary matrix array structure is stored. A processor executing at least one reduction algorithm scans the database tagging superfluous entries that are subsequently deleted. The tagging and deleting are done in such a way that the logical contents of the original database is unchanged, even though the size of the database is reduced.

5 Claims, 4 Drawing Sheets

US 7,546,281 B2

REDUCTION OF TERNARY RULES WITH COMMON PRIORITY AND ACTIONS

This is a Divisional application which claims priority of U.S. patent application Ser. No. 10/354,406, filed Jan. 30, 2003.

BACKGROUND OF THE INVENTION

1. Technical Field

The present invention relates to database management in computer networks in general and, in particular, to managing said database in a manner that simplifies or condenses its size.

2. Prior Art

Broadly, a computer network may be viewed as a plurality of nodes interconnected by communications subsystems. The communications subsystems may include transmission link (such as a T1 line), local area network (LAN), wide area network (WAN), internet, etc. The nodes may include one or more devices such as switches, routers, bridges, network interface card (NIC), etc. Usually, NICs are components that are mounted in higher level devices such as a server, etc. As used in this document a node is deemed to be synonymous to one of these devices.

A switch is a network node that directs datagrams on the basis of Medium Access Control (MAC) addresses, that is, Layer 2 in the Open Systems Interconnection Basic Reference Model (OSI model) well known to those skilled in the art [see "The Basics Book of OSI and Network Management" by Motorola Codex from Addison-Wesley Publishing Company, Inc., 1993]. A switch can also be thought of as a multiport bridge, a bridge being a device that connects two LAN segments together and forwards packets of the basis of Layer 2 data. A router is a network node that directs datagrams on the basis of finding the longest prefix in a routing table of prefixes that matches the Internet Protocol (IP) destination addresses of a datagram, all within Layer 3 in the OSI model. A Network Interface Card (NIC) is a device that interfaces a network such as the Internet with an edge resource such as a server, cluster of servers, or server farm. A NIC might classify traffic in both directions for the purpose of fulfilling Service Level Agreements (SLAs) regarding Quality of Service (QoS). A NIC may also switch or route traffic in response to classification results and current congestion conditions. The present invention applies to a network node that can be a switch, a router, NIC, or, more generally, a machine capable of classifying packets and taking an action or actions (such as discarding the packet) based upon classification results.

A necessary component of the node is the database which is generated by a network administrator. The database may be used for a variety of purposes including filtering or network processing.

Network processing in general entails examining packets relative to the database and deciding what to do with them. Usually the action to be taken is part of or is recorded in the database. This examination can be costly in terms of processing cycles, and traffic can arrive irregularly over time. Consequently, to avoid backlogs, queuing latency and the danger of buffer overflow, network nodes in general must attempt to enforce security policies or other policies based upon classification as efficiently as possible.

The database is usually arranged as a matrix including a plurality of rows and a plurality of columns. Each row represents a rule in the database. The characters in the database matrix can be 0, 1 and * (Don't care or wildcard). Because the database is made out of only three character types it is often referred to as Ternary data structure. When the Ternary data structure is loaded in a Contents Address Memory (CAM) the combination (i.e. CAM and database is referred to as a Ternary Contents Address Memory (TCAM).

Information such as in a computer network packet can be given a key. Typically a key is a fixed binary expression that is the concatenation of bits from the standard header fields of the packet. A Ternary Content Addressable Memory (TCAM) includes rows that represent classifications or rules. The rows appear in an array (a matrix, in the present invention). Each row of the array includes logical tests matching bits in a key with 0, 1, and * (don't care or wildcard) entries For example, the key 0110 would fit the rule 01** since bits in the key match bits in the rule; of course, typical keys and rules would have many more than four bit positions. That is, the length of the row is the total number of entries and is constant (typically about 100 bit positions) for all rows. It is the number of columns in the array seen as a matrix. Each row points to an action (or possible a combination of actions) and a priority (to be used if one key can match multiple rows). An input key for a packet is derived from (perhaps equal to) a packet header field or the concatenation of packet header fields with the same length as the TCAM row length. The key represents the packet and is fed to the TCAM. A key is tested simultaneously for match with the corresponding 0, 1, and * entries in the row. If no rows fit, then a default action is taken (or an all * row is included with lowest priority). Else, of all the rows that do fit, the one with highest priority is selected and its action is enforced.

A 0, 1, * (Ternary) array logically identical to that searched by a TCAM can also be searched by numerous tree search methods. In tree search technology, a few bit positions are tested and, depending upon the location and relative frequency of 0, 1 entries versus * entries, the bit tests can eliminate from consideration all but one or a few rules or rows from consideration. That is, the bit tests can be used to show that the majority of rules cannot possibly fit a certain key, leaving a relatively simple test of the fall key by one remaining rule or a few remaining rules. U.S. Pat. No. 6,298,340 "System and method and computer program for filtering using tree structure" describes one such approach. An alternate approach, called the Balanced Routing Tables (BaRT) Algorithm, is described in U.S. patent application publication: US 2002/0002549 A1, Jan. 3, 2002. Other approaches are also set forth in J. van Lunteren, "Searching very large routing tables in wide embedded memory", Proceedings IEEE Globecom, vol. 3, pp. 1615-1619, November 2001 and J. van Lunteren, "Searching Very Large Routing Tables In Fast SWAM," IEEE International Conference on Computer Communications and Networks ICCCN 2001, Phoenix, Ariz., Oct. 15-17, 2001.) The cited references are included here as if in full.

Given an array of 0, 1, * entries and a key, a TCAM has the advantage of testing the key with all rules simultaneously and discovering all matches in only one processor cycle. However, the same key and array can be tested by tree approaches that can require smaller and cheaper hardware resources, perhaps one hundred times fewer transistors, to discover matches in tens of processor cycles. The optimal approach, be it TCAM, tree, or other, to finding which 0, 1, * rows of a ternary array fit a given key depends upon performance requirements.

One of the factors influencing performance is the size (number of rows and columns) of the ternary array. Any reduction in the number of rows and/or the number of columns has a positive effect on performance in that less storage is required and the search can be done in a much shorter time interval. Even though reducing the size of the ternary array is a desirable goal the prior art has not provided an apparatus and/or method (tool) that analyzes a ternary array and provides an array that is logically equivalent but smaller than the original array.

In view of the above there is a need for such a tool that is provided by the present invention.

SUMMARY OF THE INVENTION

The present invention describes a system and method for simplification of rule arrays.

It has been observed that rules devised by humans can contain hidden redundancies or might not be as compact as possible. This can lead to arrays that are several times larger than necessary.

In a preferred embodiment, the present invention includes preprocessing a rule array as described above and can be applied to simplify the job of classification or testing by a TCAM, tree, or other method. The present invention tests a rule array for two possible simplifications. The simplifications include replacement by a smaller array (fewer rows) that is logically equivalent to the original array. This first simplification finds logical redundancies in the rules. The second simplification is based upon reduction of the rule set, that is, replacements of subsets of two or more rules by single rules that are logically equivalent.

The invention includes a Redundancy Test Algorithm. It is assumed that N (>=2) Rules are labeled by an index i with i=0, 1, 2, ..., N−1. Also, each rule is marked by a "valid bit" that is initially. The complexity of the algorithm is $O(N^2)$, where N represents the number of entries in the array. Rule number i is redundant if there exists a rule number j having the properties:

1. Every bit position that is 0 in rule i is 0 or * in rule j
2. Every bit position that is 1 in rule i is 1 or * in rule j
3. Every bit position that is * in rule i is * in rule j The pseudocode for an algorithm that systematically tests for redundancy is in Appendix A. Initially all rules have valid bits set to 1. After the Redundancy Test Algorithm runs, it is possible that some of the rules have valid bits set to 0, meaning that they can be deleted from the rule set without changing the logical application of the rules. Again, all rules in a tested set are assumed to have the same action.

The invention further includes a Reduction Algorithm that is applied to all the rules that still have the same action and priority and that have valid bit equal to 1 after application of the Redundancy Test Algorithm. It is assumed that N (>=2). Rules are labeled by an index i with i=0, 1, 2, ..., N−1. The complexity of the algorithm is $O(N^2)$. Rule number i and rule number j can be reduced to one logically equivalent rule if rule i and j have the properties:

1. Rules i and j are identical in every bit position except exactly one bit position.

The pseudocode for an algorithm that systematically tests for reductions is in Appendix B. Initially, all rules have valid bit set to 1. After the Reduction Algorithm runs, it is possible that some of the rules are changed and other rules have valid bit equal to 0, meaning that they can be deleted from the rule set without changing the logical application of the rules. All rules in a set tested by the Reduction Algorithm are assumed to have the same priority and action.

DETAILED DESCRIPTION OF INVENTION

Before describing details of the present invention some characteristics of the Rules matrix to which the invention is applicable will be discussed.

Each rule in the matrix can have one or more action attributes permit or deny could be an action attribute, as could be a rule that changes the Quality of Service designation of a packet). Two rules are said to intersect if at least one key fits both rules. Rules that intersect can have the property of priority as defined in U.S. Pat. No. 6,484,171, "System method and computer program for prioritizing filter rules". Priority means that if a key fits two or more rules, then the rule with the highest priority value is enforced. The present invention pertains to sets of rules all of which have both the same action type and the same priority.

It can happen in enforcement of rules that the action is the critical outcome, not the knowledge of which particular rule fits among a set of rules with common priority and action. It can also happen that many rules in a ternary set have the same priority and the same action. Typically this is the case with many noninteresecting rules, but it can happen with intersecting rules as well. The present invention includes reduction of such sets of ternary rules with common priority and common action, provided only the action of the rule system matters.

It can also happen that by mistake some ternary rules are redundant. Suppose any key that fits ternary rule A must also fit ternary rule B, that A and B have the same priority, and that A and B have the same action. Then rule A is said to be included in rule B. The occurrence of rule A in the ternary rule set is pointless and A should be deleted. The present invention includes detection and correction of some such redundant ternary rule mistakes.

Figure 1:
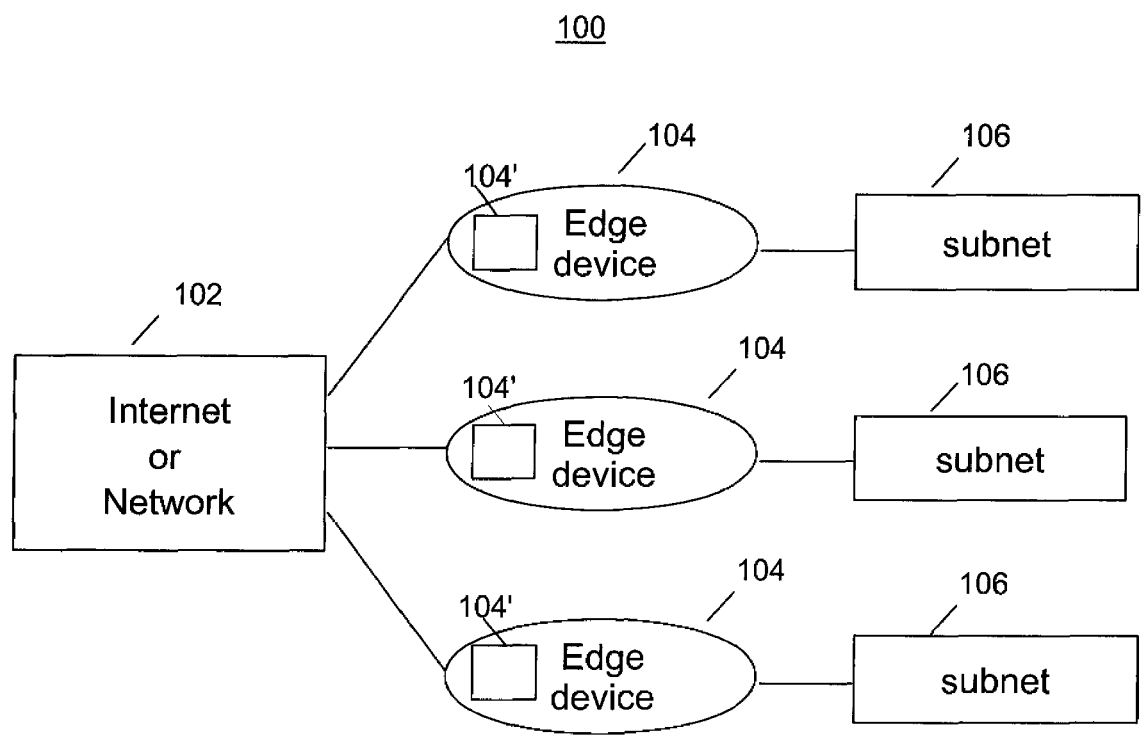
FIG. 1 shows a block diagram of a communications network including the teachings of the present invention.

FIG. 1 shows a block diagram of communications network 100 in which the present invention is implemented. The communications network 100 includes a plurality of subnetworks (subnet) 106 connected by separate edge device 104 to the internet or other types of network 102. The subnet 106 may be a wide area network, local area network, etc. The edge device may be a router bridge, server, etc. A database reduction system 104' according to the teachings of the present invention is placed in each of the edge devices. It should be noted that the database reduction system 104' may be placed in other parts of the network and not necessarily as shown in FIG. 1. Therefore, its placement in the edge device is only exemplary and should not be construed as a limitation on the scope or teachings of the present invention.

Figure 2:
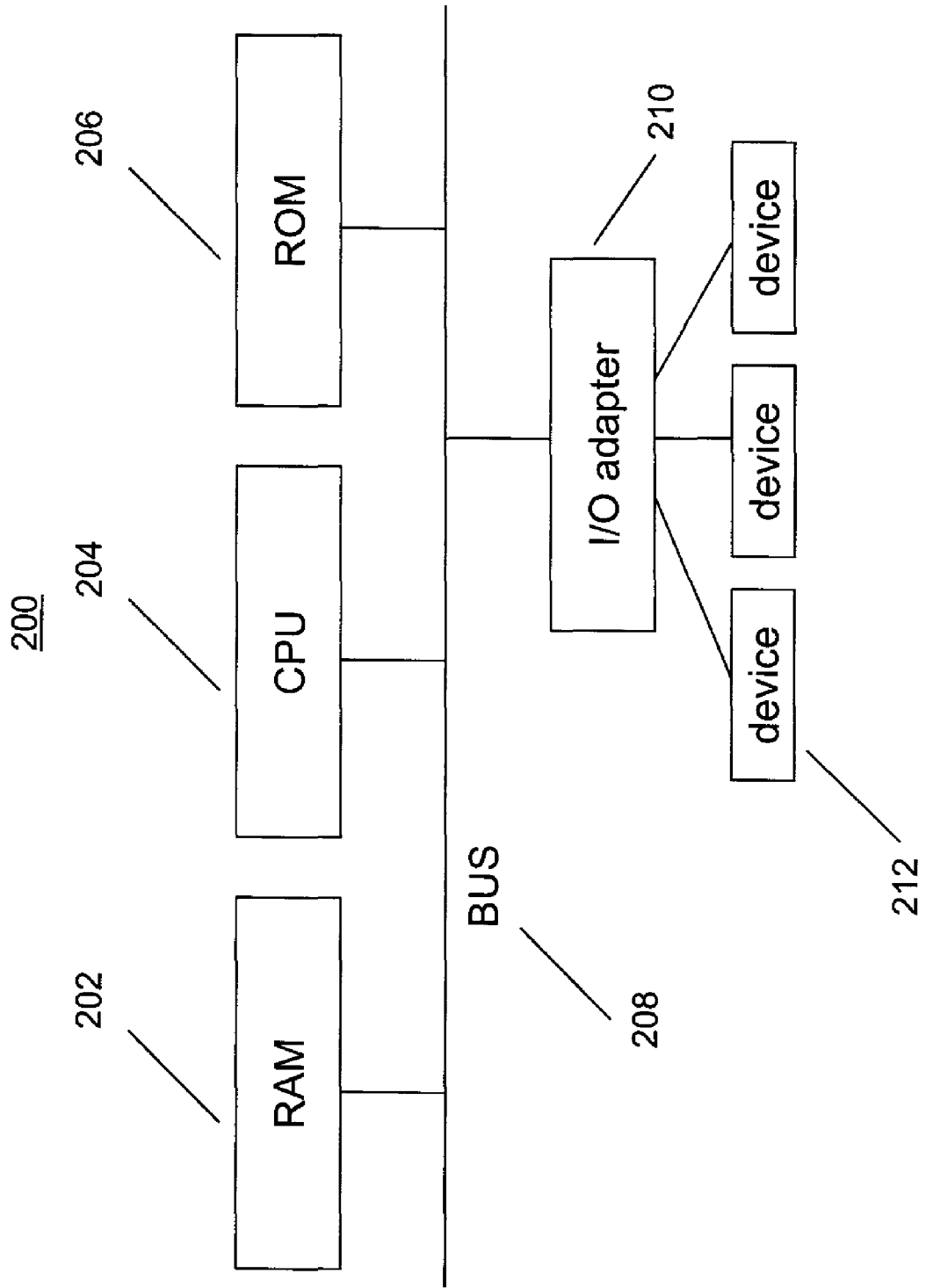
FIG. 2 shows a block diagram of a processor that executes the algorithms according to the teachings of the present invention.

The database reduction system 104' includes a computer and algorithms that are executed on the computer. Turning now to FIG. 2 a block diagram of the computer 200 is shown. The logical components of computer 200 may include Random Access Memory (RAM) 202, a Central Processing Unit (CPU) 204, Read Only Memory (ROM) 206, all connected by a Bus 208. Also connected by a Bus 208 can be an Input/Output (I/O) adapter 210 and connected to the I/O Adapter can be a plurality of one or more devices 212 including devices handling packet flows. Within edge devices in hardware or software or a combination of hardware and software may reside instances of the present invention for the purpose of classification or filtration of packets. An instance of the present invention may use a combination of the logical components in the edge device.

Figure 3:
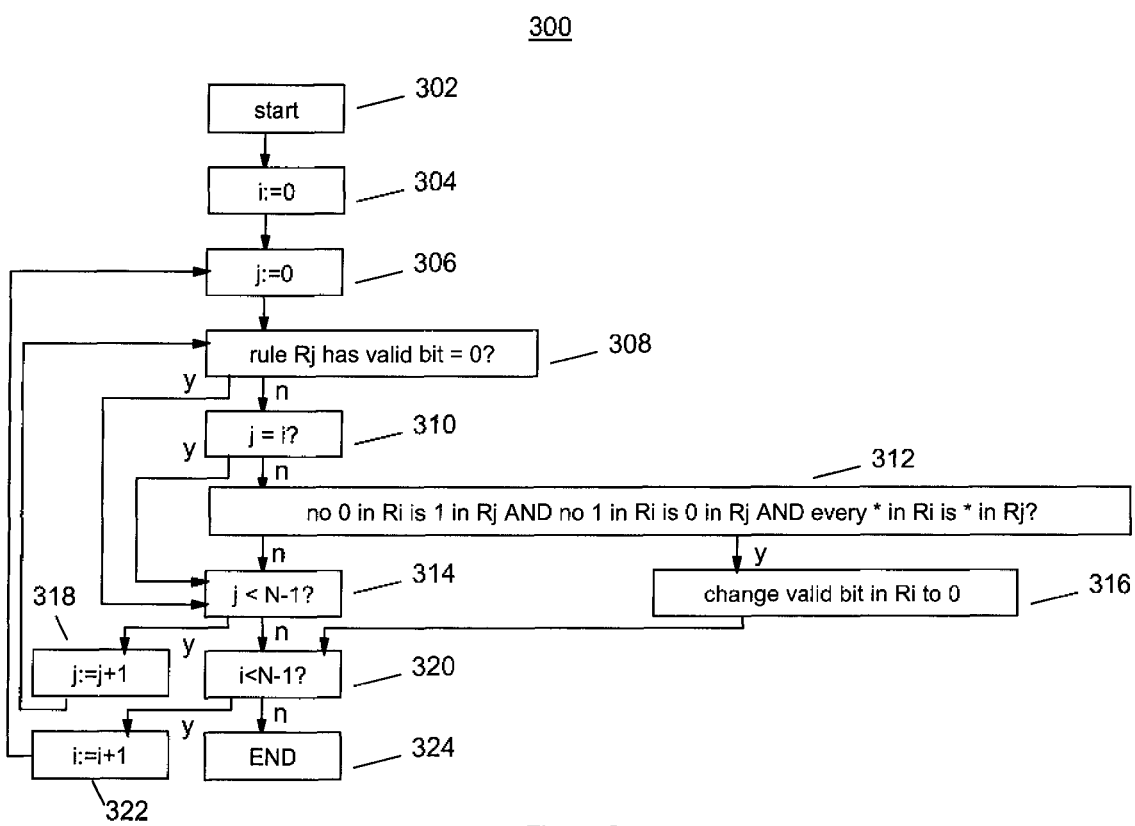
FIG. 3 shows a flow chart of the Redundancy Test Algorithm according to the teachings of the present invention. The algorithm tests for redundancy in every entry of the matrix representing the rules.

Referring to FIG. 3, shown is a flowchart 300 for the Redundancy Test Algorithm which tests a set of N rules, N being the number of Rules tested, labeled R0, R1, R2, ..., RN-1. In principle, any rule might be redundant relative to some other rule, so all combinations must be checked. Initially, each rule is assigned a valid bit with value 1. Of course other values other than 1 could be assigned to the rules without deviating from the teachings of the present invention. When the algorithm ends, N rules are in a (generally) new list and the valid bit assigned to each rule in the new list is 0 or 1. Only rules with a valid bit equal to 1 need be tested by the Redundancy Test Algorithm in order to reach a generally smaller set of rules with the same action for any key as the original rule set. The algorithm begins at the start block 302. An integer index i (corresponding to rule Ri) is initially set to 0, block 304, and an integer index j (corresponding to rule Rj) is also initially set to 0, block 306. In block 308 a test is performed, namely, "Does rule Rj have valid bit=0?" If yes, then the algorithm branches to block 314. If no, then the algorithm branches to block 310. In block 310 a test is performed, namely, "is j=i?" If yes, then the algorithm branches to block 314. If no, then the algorithm branches to another test block 312. Test in 312 asks "is no bit position that is equal to 0 in Ri equal to 1 in Rj AND is no bit position that is equal to 1 in Ri and equal to 0 in Rj AND is every bit position that is equal to * in Ri also equal to * in Rj?" If yes (this is the logical equivalent that rule Ri is redundant relative to rule Rj), then the algorithm proceeds to block 316. If no, then the algorithm proceeds to block 314. In block 314 the algorithm tests, "is j<N-1?" If yes, then the algorithm branches to block 318. If no, then the algorithm branches to block 320. In block 316 the valid bit of rule Ri is changed to 0, then the algorithm flows to block 320. In block 318 the value of j is incremented to j+1, then the algorithm flows to block 308. Block 320 tests, "is i<N-1?" If yes, then the algorithm branches to block 322. If no, then the algorithm branches to block 324. In block 322 the value of i is incremented to i+1, then the algorithm flows back to block 306. In block 324 the algorithm ends.

Figure 4:
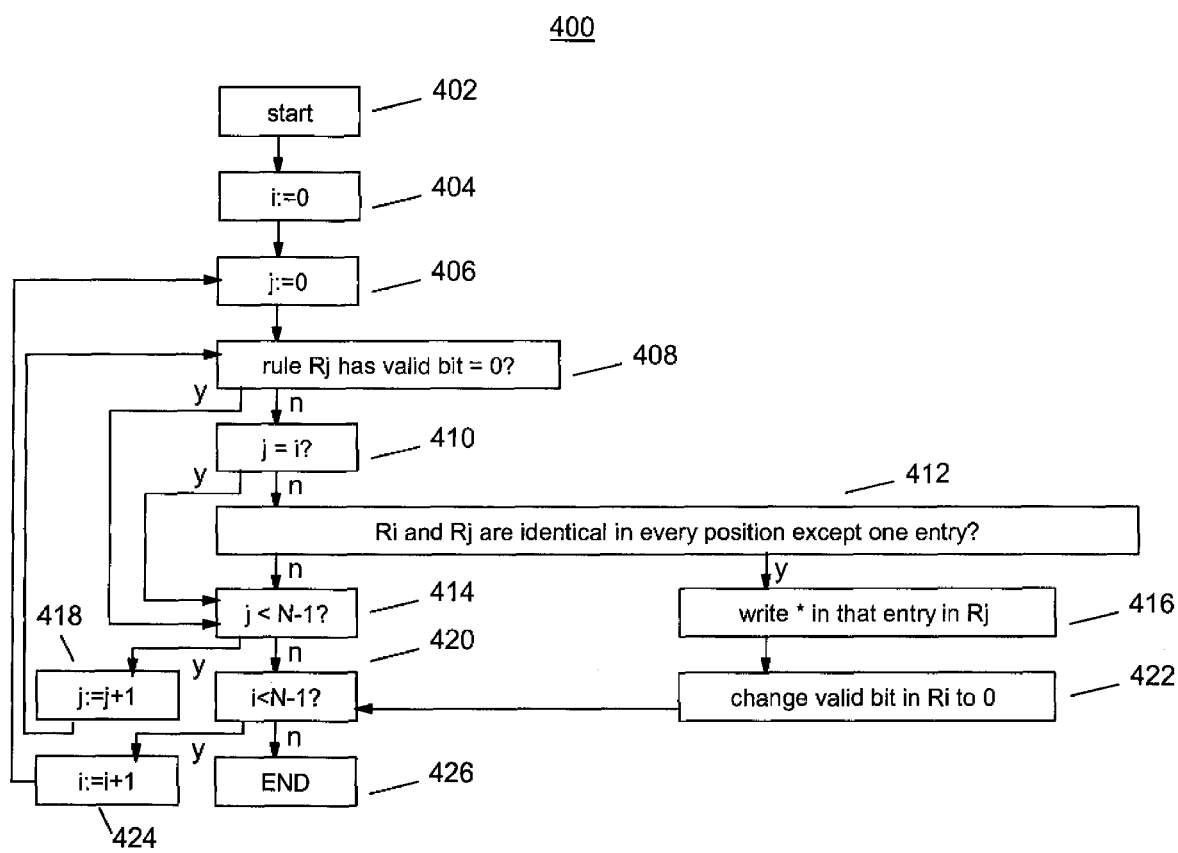
FIG. 4 shows a flow chart for the Reduction Algorithm according to the teachings of the present invention. The algorithm tests each entry against the remaining entries in the matrix to determine entries to combine.

Referring to FIG. 4, shown is a flowchart 400 for the Reduction Algorithm which tests a set of N rules labeled R0, R1, R2, ..., RN-1. In principle, any rule might be combined with any other rule to achieve a reduction, so all possibly combinations must be checked. Initially, each rule has a valid bit with value 0 or 1 assigned. In a preferred embodiment, this set is actually the output of the Reduction Test Algorithm and the rules with valid bit equal to 0 have already been deleted. When the algorithm ends, N rules are in a (generally) new output rule list and the valid bit of each rule in the output list is 0 or 1. Only output rules with a valid bit equal to 1 need be tested in order to reach the same logical result for any key as the original rule set. It should be noted the Reduction algorithm can be exercised as a standalone algorithm independent of the Redundancy algorithm.

Still referring to FIG. 4, the algorithm begins at the start block 402. An integer index i is initially set to 0, block 404, and an integer index j is also initially set to 0, block 406. In block 408 a test is performed, namely, "does rule Rj have valid bit=0?" If yes, then the algorithm proceeds to block 414. If no, then the algorithm proceeds to block 410. In block 410 a test is performed, namely, "is j=i?" If yes, then the algorithm proceeds to block 414. If no, then the algorithm proceeds to another test 412. Test 412 is "are all bit positions identical in Ri and Rj except exactly one bit position?" If yes, then the algorithm proceeds to block 416. If no, then the algorithm proceeds to block 414. In block 414 the algorithm tests, "is j<N-1?" If yes, then the algorithm branches to block 418. If no, then the algorithm branches to block 420. In block 416 the exceptional entry identified in block 412 is changed to * in rule Rj. The algorithm then flows to block 422 wherein the valid bit of rule Ri is changed to 0. The algorithm then flows to block 420. In block 418 the value of j is incremented to j+1, then the algorithm flows to block 408. Block 420 asks, "is i<N-1?" If yes, then the algorithm branches to block 424. If no, then the algorithm branches to block 426. In block 424 the value of i is incremented to i+1, then the algorithm flows back to block 408. In block 426 the algorithm ends.

Having described the algorithms of the present invention, examples of their applications follows.

Here is an example of the application of the Redundancy Test Algorithm. Suppose there are 4 synthetic ternary rules with the same action as follows. Each has 25 bit positions. Initially the rule list might be as follows.

| Rule | ternary range | valid bit |
|------|---------------|-----------|
| 0 | *00001110*100000*00011111 | 1 |
| 1 | *00001110*100000*001011** | 1 |
| 2 | *00001110*100000*00011*** | 1 |
| 3 | *00001110*1000000101* | 1 |

Note that R0 is included in R2 and R1 is included in R3. Application of the Redundancy Test Algorithm results in the following new values for the valid bits.

| Rule | ternary range | valid bit |
|------|---------------|-----------|
| 0 | *00001110*100000*00011*** | 0 |
| 1 | *00001110*100000*001011** | 0 |
| 2 | *00001110*100000*00011*** | 1 |
| 3 | *00001110*1000000101* | 1 |

Because R0 and R1 are tagged with valid bit 0, they would be dropped from the database of Rules.

Here is an application of the Reduction Algorithm to a set of 18 ternary rules from a real rule set. They all have the same priority and the same action (namely, the action is "permit").

| Rule | ternary range | valid bit |
|------|---------------|-----------|
| 0 | *00001110*100000*00011*** | 1 |
| 1 | *00001110*100000*00101*** | 1 |
| 2 | *00001110*100001*00011*** | 1 |
| 3 | *00001110*100001*00101*** | 1 |
| 4 | *00001110*100010*00011*** | 1 |
| 5 | *00001110*100010*00101*** | 1 |
| 6 | *00001110*100011*00011*** | 1 |
| 7 | *00001110*100011*00101*** | 1 |
| 8 | *00001110*001010*00011*** | 1 |
| 9 | *00001110*001010*00101*** | 1 |
| 10 | *00001110*001011*00011*** | 1 |
| 11 | *00001110*001011*00101*** | 1 |
| 12 | *00001110*010001*00011*** | 1 |
| 13 | *00001110*010001*00101*** | 1 |
| 14 | *00001110*001111*00011*** | 1 |

-continued

| Rule | ternary range | valid bit |
|------|---------------|-----------|
| 15 | *00001110*001111*00101*** | 1 |
| 16 | *00001110*010000*00011*** | 1 |
| 17 | *00001110*010000*00101*** | 1 |

Application of the Reduction Algorithm results in the following new rules and new values for the valid bit of some old rules. R0 merges with R2 to form a new R2, R4 merges with R6 to form a new R6, then R2 merges with R6 to form a new R6, and so on.

| Rule | ternary range | valid bit |
|------|---------------|-----------|
| 0 | *00001110*100000*00011*** | 0 |
| 1 | *00001110*100000*00101*** | 0 |
| 2 | *00001110*1000000011* | 0 |
| 3 | *00001110*1000000101* | 0 |
| 4 | *00001110*10001*00011*** | 0 |
| 5 | *00001110*100010*00101*** | 0 |
| 6 | *00001110*1000*00011* | 1 |
| 7 | *00001110*1000*00101* | 1 |
| 8 | *00001110*001010*00011*** | 0 |
| 9 | *00001110*001010*00101*** | 0 |
| 10 | *00001110*0010100011* | 1 |
| 11 | *00001110*0010100101* | 1 |
| 12 | *00001110*010001*00011*** | 0 |
| 13 | *00001110*010001*00101*** | 0 |
| 14 | *00001110*001111*00011*** | 1 |
| 15 | *00001110*001111*00101*** | 1 |
| 16 | *00001110*0100000011* | 1 |
| 17 | *00001110*0100000101* | 1 |

A set of 1733 real rules was considered as a test set. A total of 1654 of the rules were special permisssion rules that had one priority (highest) and one action (permit). Therefore 79 of the rules were not treated. None of the 1654 special permission rules intersects with any other of 1732 rules. Applying the Redundancy Test Algorithm results in 20 of the 1654 special permission rules being declared "redundant" in enforcement of the rules. Checking the raw rules revealed that there actually was a logical error in them. The 20 rules are already redundant in the raw form. Then applying the Reduction Algorithm to the remaining 1634 special permission rules with valid bit 1 resulted in modification of some rules and deletion of others in multiple stages, the net reduction being from 1634 rules to 639 logically equivalent rules.

In summary, the result is that applying the present invention including the Redundancy Test Algorithm and the Reduction Algorithm to a real set of 1733 rules resulted in an equivalent set of 79+639=718 ternary rules. The ratio of 1733 to 718 is 2.4.

The Appendices A, B and C describe pseudocode and C language for implementing the invention described herein.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

APPENDICES

Appendix A

Here is pseudo-code for an algorithm that systematically tests for redundancy. An equivalent flow chart for this algorithm is shown in FIG. 3.

| | Redundancy Test Algorithm |
|---|---|
| 1. | Let i = 0 |
| 2. | Let j = 0 |
| 3. | If rule Rj has valid bit = 0, then goto 6 |
| 4. | If j = i, goto 6 |
| 5. | If |
| | no 0 in Ri is 1 in Rj |
| | AND no 1 in Ri is 0 in rule Rj |
| | AND every * in Ri is * in Rj, |
| | then make the valid bit in Ri 0 AND goto 7 |
| 6. | If j < N−1, let j:=j+1, goto 3 |
| 7. | If i < N−1, let i:=i+1, goto 2 |
| 8. | END |

Appendix B

Here is pseudo-code for an algorithm that systematically tests for reduction of the rule set. An equivalent flow chart for this algorithm is shown in FIG. 4.

| | Reduction Algorithm |
|---|---|
| 1. | Let i = 0 |
| 2. | Let j = 0 |
| 3. | If rule Rj has valid bit = 0, then goto 6 |
| 4. | If j = i, goto 6 |
| 5. | If Ri and Rj are identical in every position except exactly one entry, |
| | then write * in that entry in Rj |
| | AND make the valid bit in Ri 0 |
| | AND goto 7. |
| 6. | if j < N−1, let j:=j+1, goto 3 |
| 7. | If i < N−1, let i:=i+1, goto 2 |
| 8. | END |

Appendix C

The following includes C programs that enable logic equivalent to the Redundancy Test Algorithm and the Reduction Algorithm. In this code the symbol x was used to denote "don't care."

```
****
C code that implements the Reduction Algorithm appears below.
*********************************************************************
*     Ternary Compare
*
*     This program compares a set of rules to determine if there is
*     redundancy between pairs of rules and whether rule sets can
```

-continued

```
*    be reduced by replacing a bit value with a "dont-care" symbol.
*    All rule combinations are attempted and when unification occurs
*    the rules are all re-tested to ensure that all unifications
*    are found.
*
*    Input: a text file with ternary compare rules arranged in fields
*    as in the following example:
*
*    rule     77 : x01011111 x001110 x0001 1xxx
*
*    Note that there are no leading characters in the file.
*********************************************************************/
#include <stdio.h>
main(int argc, char **argv){
        int i=0, j=0, num=0, loc, slen, rule[2048], resultCount=0, verbose = 0;
        char vector[2048][64], valid[2048], dataFileString[128];
        char s2[32], s3[32], s4[32];
        FILE *dataFile, *resultFile;
        if (argc < 2){
             printf("Usage: tc InputRuleFile\n");
             exit(-1);
        }
        /* open the input file */
        strcpy(dataFileString, argv[1]);
        dataFile = fopen(dataFileString, "r");
        if (dataFile == NULL){
                printf("Could not open %s\n", dataFileString);
                exit(-1);
        }
        /* open the output file */
        strcat(dataFileString, ".result");
        resultFile = fopen(dataFileString, "w");
        if (resultFile == NULL){
                printf("Could not open %s\n", dataFileString);
                exit(-1);
        }
        /* initialize valid bits */
        for(i=0; i<2048; i++)
             valid[i] = 1;
        /* print out Notes */
        fprintf(resultFile, "Notes:\n'*' indicates a compression, so that it can be\n");
        fprintf(resultFile, "distinguished from the original dont-care 'x'\n");
        fprintf(resultFile, "\nThe result index is relative to the position in the
input \n");
        fprintf(resultFile, "vector file, not the rule index. \n");
        printf("Notes:\n'*' indicates a compression, so that it can be\n");
        printf("distinguished from the original dont-care 'x'\n");
        printf("\nThe result index is relative to the position in the input\n");
        printf("vector file, not the rule index. \n"};
        /* read vectors from file */
        while (fscanf(dataFile, "rule %d : %s %s %s %s\n",
                                        &rule[num], vector[num], s2, s3, s4) != EOF){
                strcat(vector[num], s2);
                strcat(vector[num], s3);
                strcat(vector[num], s4);
                num++;
                if (verbose) if (num > 100) break;
                if (verbose) printf("the string is %s\n", vector[num-1]);
        }
        printf("Read %d vectors, processing...\n\n", num);
        /* start redundancy test algorithm */
        resultCount = 0 ;
        printf("starting redundancy test algorithm...\n");
        for(i=0; i < num; i++){
             for(j=0; j < num-1; j++){
                        if (!valid[i]) continue;
                        if (i == j) continue;
                        if (redundantCheck(vector[i], vector[j])){
                             valid[i] = 0;
                             printf("%s is contained in \n%s (%d, %d)\n",
                                        vector[i], vector[j], rule[i], rule[j]);
                             resultCount++;
                             break;          /* go to next Ri */
                        }
             }
        }
        printf("found %d redundancies\n\n", resultCount);
        /* start reduction algorithm */
        resultCount = 0;
```

-continued

```
        printf("starting reduction algorithm...\n");
        fflush(stdout);
        for(i=0; i < num; i++){
                if (!valid[i]) continue;          /* this vector has already been removed   */
                                                  /* so there is no need to test it         */
                for(j=i+1; j<num-1; j++){
                        if (!valid[j]) continue;  /* this vector has already been removed   */
                                                  /* so there is no need to test it         */
                        loc = findLocation(vector[i], vector[j]);
                        if (loc >= 0){            /* found an off-by-one vector pair */
                                if (verbose)
                                        printf("\trule %d: %s %s -> ", rule[i], vector[i],
                                        vector[j]);
                                vector[i][loc] = '*';
                                valid[j] = 0;
                                i = -1;           /* loop will increment, making i==0 */
                                break;            /* break out of inner loop */
                        }
                }
        }
        printf("completed.   Writing results...\n");
        slen = strlen(vector[0]);
        /* printf("\n\nResults:\n---------------\n"); */
        fprintf(resultFile, "\n\nResults:\n---------------\n");
        for(i=0; i < num; i++){
                if (valid[i]){
                        /* printf("%4d) %s\n", i, vector[i]); */
                        fprintf(resultFile, "%4d) %s\n", i, vector[i]);
                        resultCount++;
                }
        }
        printf("\nCompressed %d vectors to %d, compression factor: %5.2f\n",
                num, resultCount, (float)num/(float)resultCount);
        fprintf(resultFile,"\nCompressed %d vectors to %d, compression factor: %5.2f\n",
                num, resultCount, (float)num/(float)resultCount);
}
/*
 * determine if Ri is redundant with Rj
 */
int redundantCheck(char *Ri, char *Rj){
        int k, len;
        len = strlen(Ri);
        for(k=0; k< len; k++){
                if ((Ri[k] == '0')&&(Rj[k] == '1')) return 0; /* return if we prove that  */
                if ((Ri[k] == '1')&&(Rj[k] == '0')) return 0; /* it is not redundant      */
                if ((Ri[k] == 'x')&&(Rj[k] != 'x')) return 0;
        }
        return 1;
}
/*
 * find location of single difference
 */
findLocation(char *Ri, char *Rj ){
        int i,j, stringLength, location;
        stringLength = strlen(Ri);
        if (stringLength != strlen(Rj)){
                printf("Error in the string lengths!\n");
                exit(-1);
        }
        /* look for the first difference */
        for(i=0, location=0; i< stringLength; i++)
                if (Ri[i] != Rj[i]){
                        location = i;
                        break;
                }
        /* if there is a second difference, return with no result */
        for(i++; i< stringLength; i++)
                if (Ri[i] != Rj[i])
                        return(-1); /* no result found here */
        return(location);
```

What is claimed is:

1. A method to reduce the size of a ternary data structure database, the method comprising the acts of:
   providing the database in a memory such that the database includes a listing of N rules, where N>=2, such that each rule (R) of the N rules represents a row of data in the database and has an associated integer index having a value of 0, 1, 2 ... N and includes bit characters 0, 1 and * (wild card or don't care) representing values of bits included in each rule in the database;
   tagging each rule with a valid bit having an initial value of 1;
   processing the N rules using a redundancy test algorithm that identifies which rules of the database are included in other rules of the database and therefore should be deleted from the data base as being redundant, such that the redundancy test algorithm includes the following steps:
   step 1 setting an integer index i of rule Ri to initially be 0;
   step 2 setting an integer index j of rule Rj to initially be 0;
   step 3 if the valid bit of rule Rj=0, then go to step 6;
   step 4 if the integer index j=i, then go to step 6;
   step 5 if no bit of rule Ri having a value of 0 is positioned in rule Ri in a same bit position as a bit in rule Rj having a value of 1, AND if no bit of rule Ri having a value of 1 is positioned in rule Ri in a same bit position as a bit in rule Rj having a value of 0, AND if every bit of rule Ri having the a value of * is positioned in a same bit position as a bit in rule Rj having the value of *, then rule Ri is identified as being redundant relative to rule Rj such that the valid bit with which rule Ri is tagged is reset to 0, and go to step 7;
   step 6 if the integer index j<N−1, then increment j by 1 such that j:=j+1, and go to step 3;
   step 7 if the integer index i<N−1, then increment i by 1 such that i:=i+1, and go to step 2;
   step 8 END;
   deleting redundant rules Ri from the database for which an associated tagged valid bit has been reset to 0;
   processing remaining N rules of the database which have not been deleted as being redundant and which have a value of 1 for an associated tagged valid bit using a rule reduction algorithm to identify which of the remaining N rules are identical to other remaining N rules in all bit positions except exactly one bit position; and
   deleting from the database remaining N rules which have been identified as being identical to other remaining N rules in all bit positions except exactly one bit position.

2. The method of claim 1, wherein the processing of the remaining N rules of the database using the rule reduction algorithm includes, after application of the redundancy test algorithm and the deleting of the redundant rules Ri from the database,
   applying to the remaining N rules of the database an algorithm which includes the steps of:
   step 1 setting the integer index i to initially be 0;
   step 2 setting the integer index j to initially be 0;
   step 3 if rule Rj has an associated valid bit=0, then go to step 6;
   step 4 if the integer index j=i, then go to step 6;
   step 5 if rule Ri and rule Rj are identical in value in every bit position except exactly one bit position, then write the value * in that one bit position in rule Rj, reset the valid bit associated with rule Ri to 0, and go to step 7;
   step 6 if the integer index j<N−1, then increment j by 1 such that j:=j+1 and go to step 3;
   step 7 if the integer index i<N−1, then increment i by 1 such that i:=i+1 and go to step 2;
   step 8 END.

3. The method of claim 1, wherein the N rules represent a description of policies including security policies to be enforced regarding traffic of packet data at an edge device flowing in either direction.

4. The method of claim 1, wherein the N rules of the ternary data structure database have the same priority and action type.

5. The method of claim 1, wherein the ternary data structure database comprises a two-dimensional array of N rules.

* * * * *